United States Patent
Vyas et al.

(10) Patent No.: US 10,747,810 B2
(45) Date of Patent: Aug. 18, 2020

(54) LOW POWER SUPERVISED SEMANTIC-PRESERVING SHALLOW HASHING

(71) Applicant: Intel Corporation, Santa Clara, CA (US)

(72) Inventors: Apoorv Vyas, Bangalore (IN); Darshan Mehta, Bangalore (IN); Srenivas Varadarajan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 15/792,940

(22) Filed: Oct. 25, 2017

(65) Prior Publication Data

US 2019/0121877 A1  Apr. 25, 2019

(51) Int. Cl.
G06F 16/583 (2019.01)
G06K 9/62 (2006.01)
G06N 3/04 (2006.01)

(52) U.S. Cl.
CPC ........ *G06F 16/5838* (2019.01); *G06F 16/583* (2019.01); *G06K 9/6263* (2013.01); *G06N 3/0427* (2013.01); *G06K 9/6256* (2013.01); *G06T 2207/20081* (2013.01); *G06T 2207/20084* (2013.01)

(58) Field of Classification Search
None
See application file for complete search history.

(56) References Cited

PUBLICATIONS

Liu (Liu, Haomiao & Wang, Ruiping & Shan, Shiguang & Chen, Xilin. (2016). Deep Supervised Hashing for Fast Image Retrieval. 2064-2072. 10.1109/CVPR.2016.227).*
Yasoubi (Ali Yasoubi, 72 IEEE Computer Architecture Letters, vol. 16, No. 1, Jan.-Jun. 2017 Power-Efficient Accelerator Design for).*
McDonnel (Mark D. McDonnell, Computational and Theoretical Neuroscience Laboratory, Institute for Telecommunications Research, Shallow Convolutional Neural Network, 2015 IEEE).*
Gionis et al., "Similarity Search in High Dimensions via Hashing", Proceedings of the 25th VLDB Conference, Edinburgh, Scotland, 1999, pp. 518-529.
Liu et al., "Deep Supervised Hashing for Fast Image Retrieval", The IEEE Conference on Computer Vision and Pattern Recognition (CVPR), 2016, pp. 2064-2072.
Yang et al., "Supervised Learning of Semantics-Preserving Hash via Deep Convolutional Neural Networks", IEEE Transactions on Pattern Analysis and Machine Intelligence, Feb. 14, 2017, 15 pages.

* cited by examiner

*Primary Examiner* — Mark Roz
(74) *Attorney, Agent, or Firm* — Green, Howard & Mughal LLP.

(57) ABSTRACT

A semiconductor package apparatus may include technology to provide an image to a low power shallow hash network, generate a hash code from the low power shallow hash network, and identify one or more similar images based on the hash code. Other embodiments are disclosed and claimed.

16 Claims, 11 Drawing Sheets

LOW POWER SUPERVISED SEMANTIC-PRESERVING SHALLOW HASHING

TECHNICAL FIELD

Embodiments generally relate to content-based image retrieval. More particularly, embodiments relate to low power supervised semantic-preserving shallow hashing.

BACKGROUND

A content-based image retrieval (CBIR) system may involve a search query to find relevant images to the query. For example, an input query image may contain a person wearing a denim jacket and query outputs may include images of people with similar outfits. Example applications of CBIR systems may include search engines, e-commerce product search/recommendation, and local search on a handheld device.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
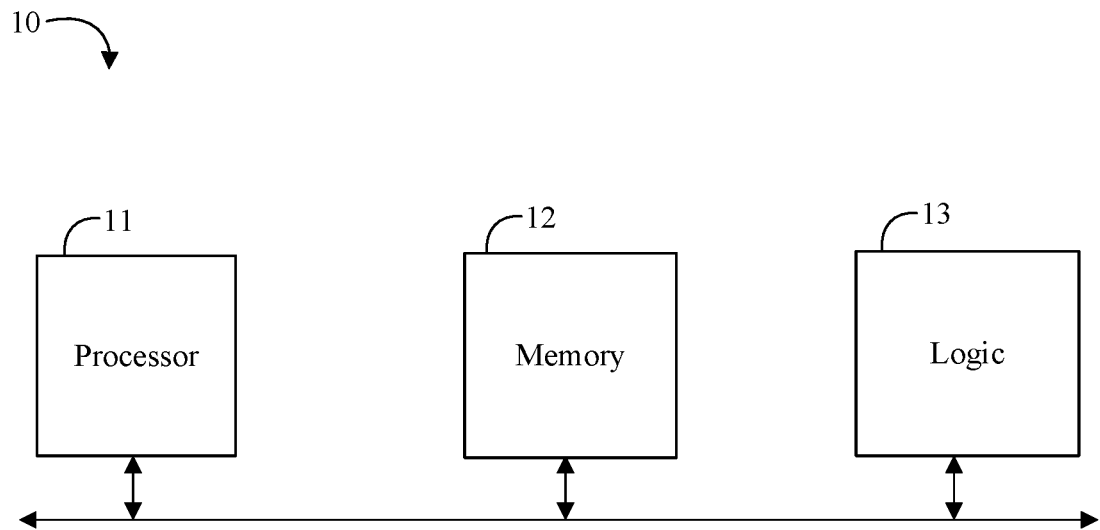
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to provide an image to a low power shallow hash network, generate a hash code from the low power shallow hash network, and identify one or more similar images based on the hash code. In some embodiments, the logic 13 may be further configured to provide a set of hash codes, and train a shallow neural network to provide the low power shallow hash network based on the set of hash codes as label data. For example, the logic 13 may also be configured to adjust a bitwise threshold based on a match between a set of target hash codes and one or more hash codes from the shallow neural network. In some embodiments, the logic 13 may be further configured to stop the train of the shallow neural network based on a hash code evaluation criteria. For example, the logic 13 may be configured to return the low power shallow hash network corresponding to a highest mean average precision (mAP) accuracy. In some embodiments, the logic 13 may be further configured to train a deep neural network to generate the set of hash codes based on a set of training images (e.g., the deep neural network may be deeper than the shallow neural network).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, providing the image to the low power shallow hash network, generating the hash code from the low power shallow hash network, identifying the one or more similar images based on the hash code, etc.).

Figure 2:
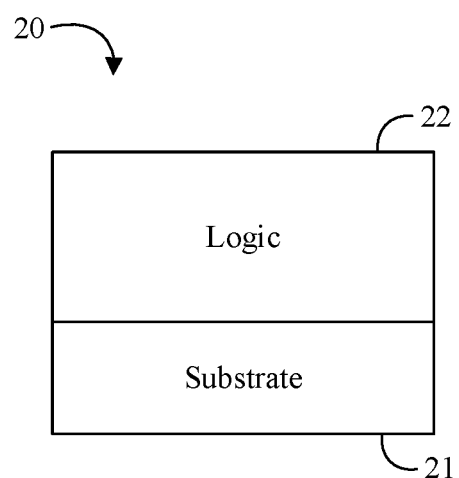
FIG. 2 is a block diagram of an example of a semiconductor package apparatus according to an embodiment.

Turning now to FIG. 2, an embodiment of a semiconductor package apparatus 20 may include a substrate 21, and logic 22 coupled to the substrate 21, wherein the logic 22 may be at least partly implemented in one or more of configurable logic and fixed-functionality hardware logic. The logic 22 coupled to the substrate 21 may be configured to provide an image to a low power shallow hash network, generate a hash code from the low power shallow hash network, and identify one or more similar images based on the hash code. In some embodiments, the logic 22 may be further configured to provide a set of hash codes, and train a shallow neural network to provide the low power shallow hash network based on the set of hash codes as label data. For example, the logic 22 may also be configured to adjust a bitwise threshold based on a match between a set of target hash codes and one or more hash codes from the shallow neural network. In some embodiments, the logic 22 may be further configured to stop the train of the shallow neural network based on a hash code evaluation criteria. For example, the logic 22 may be configured to return the low power shallow hash network corresponding to a highest mAP accuracy. In some embodiments, the logic 22 may be further configured to train a deep neural network to generate the set of hash codes based on a set of training images.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
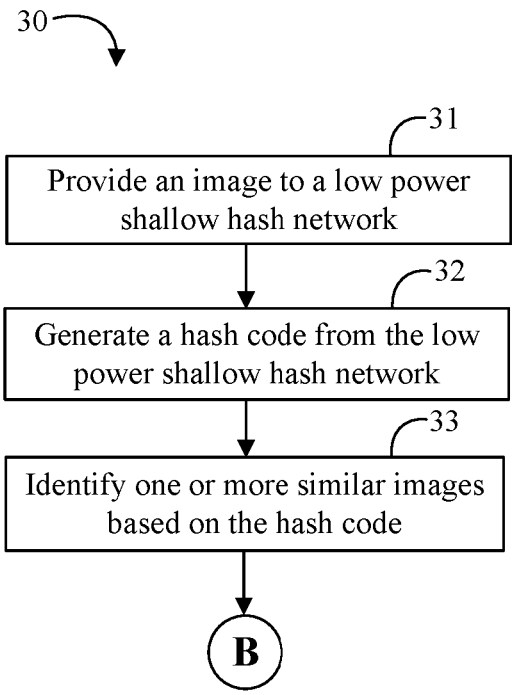
FIGS. 3A to 3B are flowcharts of an example of a method of identifying images according to an embodiment.
Figure 3B:
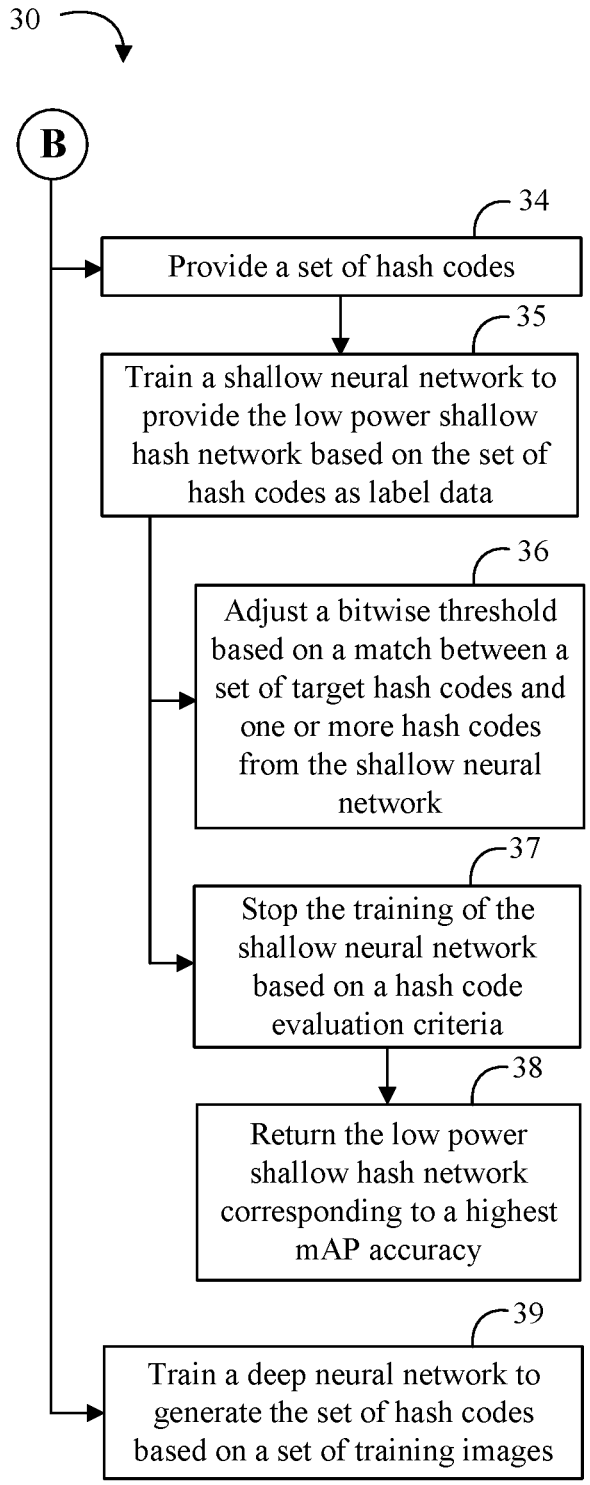

Turning now to FIGS. 3A to 3B, an embodiment of a method 30 of identifying images may include providing an image to a low power shallow hash network at block 31, generating a hash code from the low power shallow hash network at block 32, and identifying one or more similar images based on the hash code at block 33. The method 30 may further include providing a set of hash codes at block 34, and training a shallow neural network to provide the low power shallow hash network based on the set of hash codes as label data at block 35. Some embodiments of the method 30 may also include adjusting a bitwise threshold based on a match between a set of target hash codes and one or more hash codes from the shallow neural network at block 36, and/or stopping the training of the shallow neural network based on a hash code evaluation criteria at block 37. For example, the method 30 may include returning the low power shallow hash network corresponding to a highest mAP accuracy at block 38. Some embodiments of the method 30 may further include training a deep neural network to generate the set of hash codes based on a set of training images at block 39.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Figure 4:
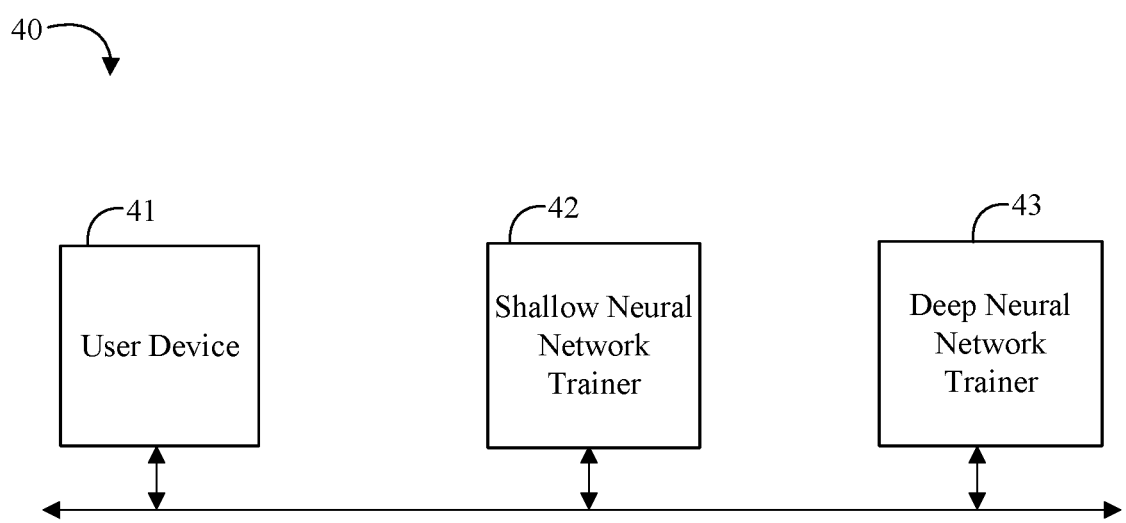
FIG. 4 is a block diagram of an example of an image retrieval system according to an embodiment.

Turning now to FIG. 4, an embodiment of an image retrieval system 40 may include a user device 41 communicatively coupled to a shallow neural network trainer 42 (e.g., wired or wirelessly through, for example, a server or the cloud). For example, the user device 41 may be a hand-held device such as a smartphone or a tablet computer. The shallow neural network trainer 42 may be communicatively coupled to a deep neural network trainer 43 (e.g., wired or wirelessly). For example, the shallow neural network trainer 42 and/or the deep neural network trainer 43 may run on a server or cloud computer system. For example, the user device 41 may include technology to provide an image to a low power shallow hash network (e.g., on the user device 41), generate a hash code from the low power shallow hash network, and identify one or more similar images based on the hash code. The shallow neural network trainer 42 may be configured to provide a set of hash codes (e.g., pre-generated externally and stored on the shallow neural network trainer 42), and train a shallow neural network to provide the low power shallow hash network to the user device 41 based on the set of hash codes as label data (e.g., utilizing the set of hash codes as ground truth for the training).

For example, the shallow neural network trainer 42 may also be configured to adjust a bitwise threshold based on a match between a set of target hash codes and one or more hash codes from the shallow neural network. In some embodiments, the shallow neural network trainer 42 may be further configured to stop the training of the shallow neural network based on a hash code evaluation criteria. For example, the shallow neural network trainer 42 may be configured to return the low power shallow hash network corresponding to a highest mAP accuracy. In some embodiments, the deep neural network trainer 43 may be configured to train a deep neural network (e.g., deeper as compared to the shallow neural network) to generate the set of hash codes based on a set of training images (e.g., where the set of hash codes are to be utilized by the shallow neural network trainer 42 to train the low power shallow hash network).

Embodiments of the user device 41, the shallow neural network trainer 42, the deep neural network trainer 43, and other components of the image retrieval system 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide low power supervised semantic-preserving shallow hashing (LPSSSH). A CBIR system may involve an image search query. Semantic search may be an important element in some CBIR systems. A semantic similarity search may involve a large-scale collection of images that may be represented as points in a high dimensional space. The semantic search may extract meaningful features and project those features on a low dimensional space, where semantically similar images may be close to each other and the closeness may be quantified through a low-cost distance metric for fast image retrieval.

Hashing techniques that construct similarity-preserving binary codes for semantic image search may provide fast and efficient image retrieval capabilities. A hashing-based approach may construct hash functions to map each image to a compact binary vector such that visually similar images are mapped into similar binary codes. Hashing techniques may also be important when the end application only requires the semantic information rather than the high-quality image. For example, the compact binary representation constructed by a hashing function may enable an edge device to send out only the compressed hash code(s) rather than high resolution images.

Some hashing techniques may include unsupervised learning such as locality sensitive hashing (LSH) which may only use images to generate hash codes. Other hashing techniques may include supervised learning such as deep supervised hashing (DSH) and supervised semantic-preserving deep hashing (SSDH) which may use both image and corresponding data label(s) to generate hash codes. LSH and its extensions based on randomized projections may be widely used, but these techniques may have a problem in that they may require long codes leading to more storage cost and may also have low recall when compared against supervised learning algorithms. Moreover, LSH-based techniques don't make use of any labeled data information and thus are sub-optimal in cases where data labels are available. DSH-based techniques may take image pairs as input to generate close hash codes for similar images and distinct hash codes for dissimilar images. However, DSH may be impractical for large datasets because it explodes the total number of possible image-pairs. SSDH-based techniques may take only a single image at a time as input and may add classification loss on top of a hashing layer to use label information. However, SSDH may use a very deep convolutional neural network (CNN) (e.g., ALEXNET) with a huge number of parameters and may accordingly be very compute intensive. Accordingly, it may be impractical to use such a complex deep network on portable hand-held devices or edge devices.

Advantageously, some embodiments may provide a LPSSSH that may use a two-pass learning technique to generate near-optimal hash codes for image retrieval applications with much fewer parameters. Some embodiments may advantageously use less compute bandwidth and lower power consumption as compared to other hashing techniques, while still providing high accuracy. For example, some embodiments may first train a deeper network such as a SSDH network to generate hash codes for training images. The generated hash codes may then be utilized for supervised training of a LPSSSH network with much fewer parameters. Advantageously, some embodiments may be well-suited for hand-held devices (e.g., smartphones, tablets, etc.) and/or edge devices (e.g., cameras, sensors, sensor networks, autonomous cars, etc.). Some embodiments may include further improvements for shallow hashing by incorporating adaptive bitwise thresholding and/or mAP-based early stopping for efficient training of the LPSSSH network. Advantageously, some embodiments of a LPSSSH network may use about 1-2% of the parameters as compared to a SSDH network and may achieve about 95% of the mAP score as compared to the SSDH network (e.g., based on the CIFAR10 and NUS-WIDE datasets). Some embodiments of the LPSSSH network may have a higher mAP score as compared to a DSH network with a comparable number of parameters. Some embodiments of the LPSSSH network may generate more compact hash codes and may provide high recall as compared to LSH.

In general, a deeper neural network may provide outperform a shallower neural network when applying the same technique, albeit with the utilization of more resources. For example, performing training on a shallower neural network may provide a significantly lower mAP score as compared to training with the same technique on a deeper neural network. Advantageously, some embodiments employ a different technique for training the shallow neural network which provides comparable accuracy as the deeper neural network while utilizing substantially fewer resources. For example, some embodiments may utilize hash codes generated by the deeper neural network as the ground truth labels for training the shallow neural network (e.g., two pass training). The shallow neural network may be trained to predict the output of the deep neural network. In some embodiments, the hash codes labels may be pre-generated, such that the shallow neural network may be trained with much fewer parameters in one pass. In some embodiments, the deep neural network and the shallow neural network may be jointly trained end-to-end. Advantageously, the shallow neural network in accordance with some embodiments may be deployed on a memory constrained device while still providing good accuracy for CBIR applications.

Figure 5:
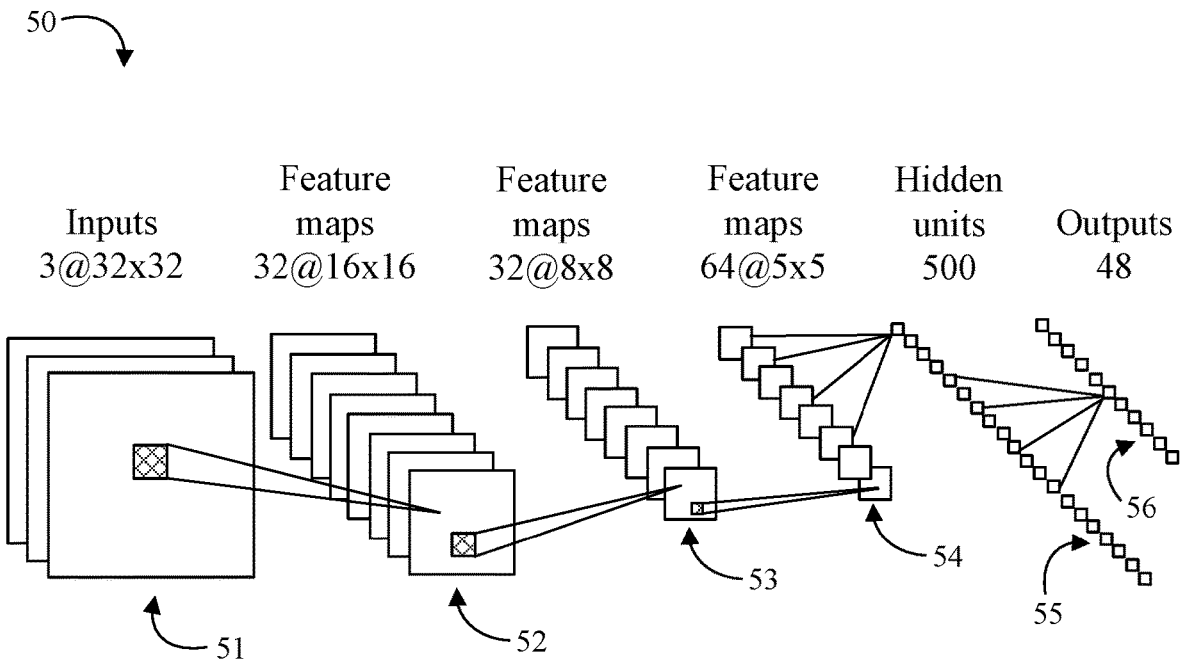
FIG. 5 is an illustrative diagram of an example of a shallow neural network according to an embodiment.

Turning now to FIG. 5, an embodiment of a shallow neural network (SNN) 50 may include three (3) convolutional (CONV) layers and two fully connected (FC) layers. Inputs 51 to the SNN 50 may include three (3) 32×32 pixel blocks (e.g., one each for red, green, and blue (RGB) colors of an image). A first CONV layer 52 may include thirty-two (32) 16×16 feature maps. A second CONV layer 53 may include 32 8×8 feature maps. A third CONV layer 54 may include 64 5×5 feature maps. A first FC layer 55 may include 500 hidden units. A second FC layer 56 may include 48 output dimensions. As compared to an example deep SSDH network with five (5) CONV layers and three (3) FC layers, the SSN 50 may advantageously utilize only about 1% of the parameters. Although, deep networks may achieve high accuracy on image retrieval tasks, they are unsuitable for some applications due to the large number of parameters, high compute and high power requirements (e.g., mobile applications, edge applications, etc.). On the other hand, shallow networks are suitable for edge applications due to lower compute and fewer parameters, but, they perform poorly when trained using the conventional classification loss and hashing loss. Some embodiments may advantageously provide the best of both worlds by using a pre-trained helper deep CNN to train a shallow network. Instead of training a shallow network using the proposed hash losses (triplet loss, orthogonality loss), for example, some embodiments may use the hash bits output by the deep network as ground truth to directly minimize the cross-entropy loss between the hash code output by the shallow network and the helper deep network.

Figure 6A:
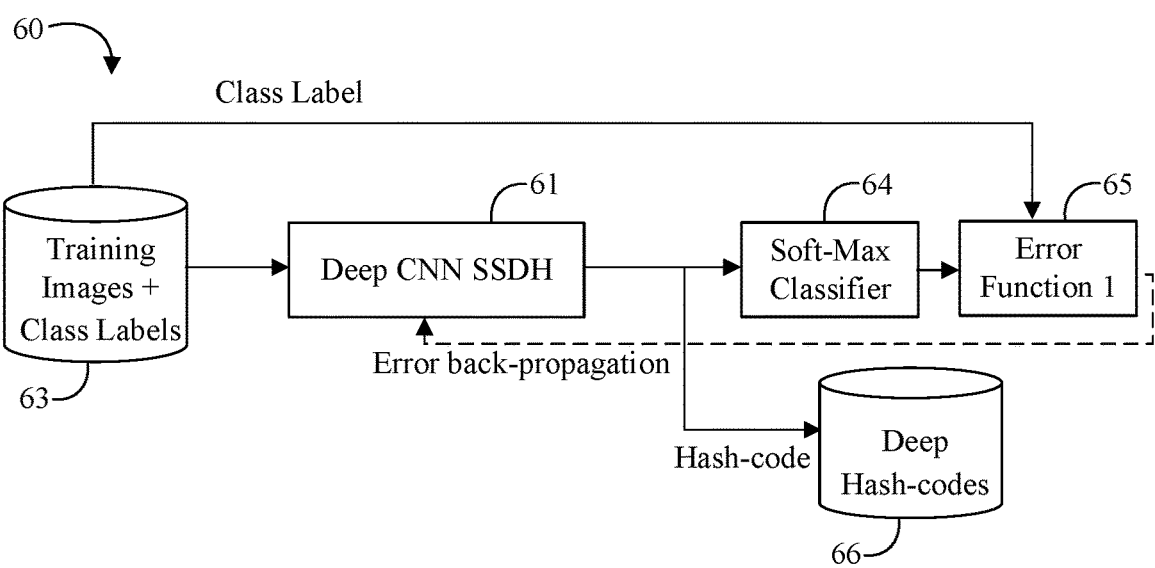
FIGS. 6A and 6B are block diagrams of an example of an illustrative system according to an embodiment.
Figure 6B:
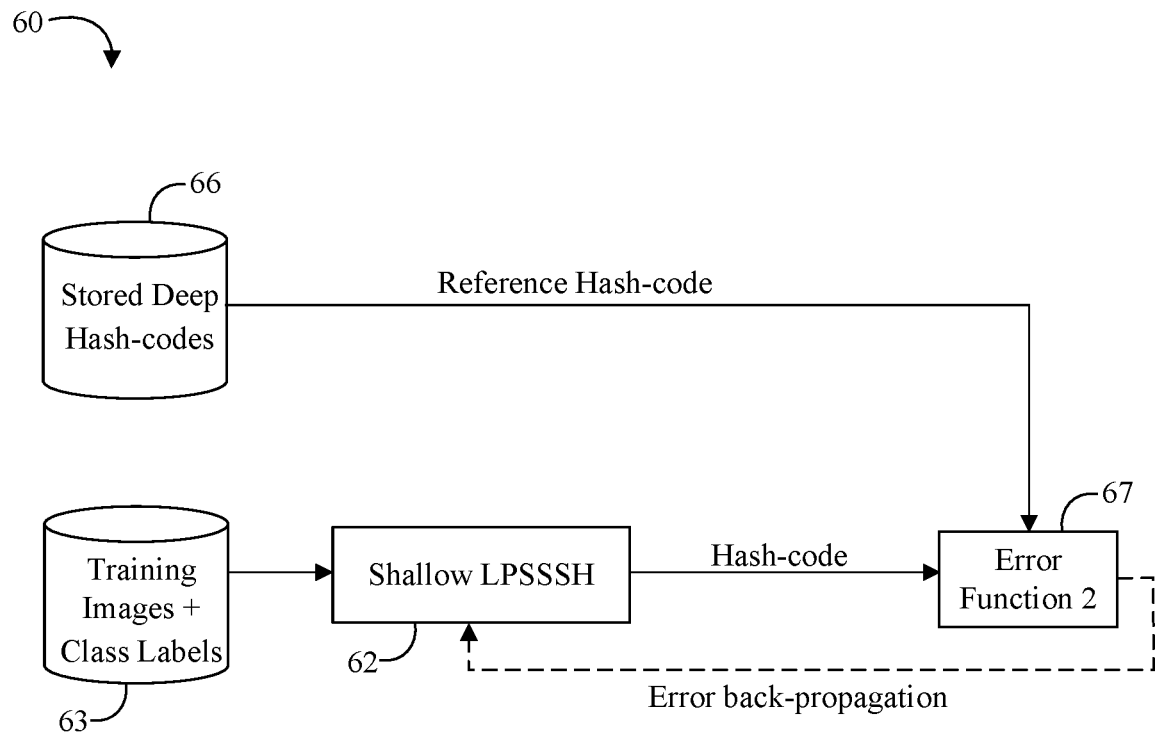

Turning now to FIGS. 6A and 6B, an embodiment of an illustrative system 60 to train a shallow LPSSSH network for efficient image retrieval may include a deep convolutional neural network (CNN) SSDH network 61 and a shallow LPSSSH network 62. A dataset store 63 may store a dataset including training images and class labels. The deep CNN SSDH network 61 may read the information from the dataset store 63 to classify the images and to provide an output to a soft-max classifier layer 64. An output of the soft-max classifier layer 64 may be provided to a first error function 65 together with class label information from the dataset store 63, with an error back-propagation provided from the first error function 65 to the deep CNN SSDH network 61. Hash codes output from the deep CNN SSDH network 61 may be stored in a deep hash code store 66. The shallow LPSSSH network 62 may read the same training images and class labels from the dataset store 63 and the shallow LPSSSH network 62 may output hash codes to a second error function 67. The second error function 67 may read reference hash codes from the deep hash code store 66 and provide error back-propagation to the shallow LPSSSH network 62.

The shallow LPSSSH network 62 training may intelligently use the hash codes output of the deep CNN SSDH network 61 trained on the same labelled data to provide a rich supervision signal to the shallow LPSSSH network 62 with much fewer layers. Some embodiments may train the LPSSSH network 62 using a two-pass training process. First, using a set of labelled training data, the deep CNN SSDH network 61 may be trained to generate and store the deep hash codes. These deep hash codes may then be used as target labels for training the shallow LPSSSH network 62. The loss function for the first error function 65 may be based on any suitable loss function including triplet loss, classification loss, etc. Next, labelled images and the corresponding deep hash codes may be used to train the LPSSSH network 62. The deep hash codes and shallow hash codes may be provided to the second error function 67 which may include cross entropy loss, least squares loss, etc. The error may then be back-propagated to update the weights of the shallow LPSSSH network 62.

Figure 7:
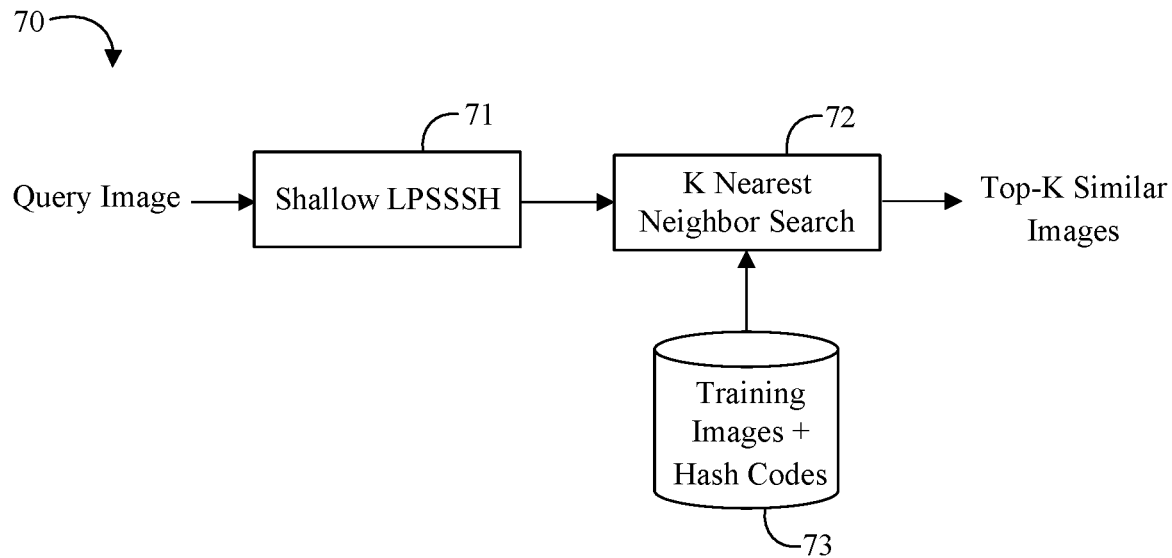
FIG. 7 is a block diagram of an example of an illustrative electronic apparatus according to an embodiment.

Turning now to FIG. 7, an embodiment of an illustrative electronic apparatus 70 with CBIR features may include a shallow LPSSSH network 71 communicatively coupled to a K-nearest neighbor search engine 72. The search engine 72 may read information from an image and hash code store 73 to provide the top K similar images to the query image. For example, the shallow LPSSSH network 71 may generate a hash code based on the query image which is then compared against stored hash codes to retrieve the closest images. Advantageously, the shallow LPSSSH network 71 may provide high accuracy while using relatively few parameters which reduces the compute and power requirements for the apparatus 70 and may make the apparatus suitable for implementation in a battery powered hand-held device and/or edge device.

Some embodiments may improve the training of the shallow hashing neural network with adaptive bitwise thresholding. Hash codes generated by a deep SSDH network may not have evenly distributed ones (1s) and zeros (0s) along each dimension (e.g., bit-position). For an input image I, for example, the output of both a deep SSDH and an embodiment of a LPSSSH network may be a code vector of length L with numbers in the range [0, 1]. This code vector may then be binarized by using a threshold value. For deep SSDH hash codes, a threshold value of 0.5 may be used to binarize the code vector. For a particular dimension D of the code vector, where D is in the range [0, L−1], the distribution of 1s and 0s over all the training images at dimension D may not be evenly distributed. Rather than using a fixed 0.5 threshold for binary shallow network hash codes, some embodiments may advantageously account for a skewed distribution of the deep SSDH hash codes. For example, some embodiments may compare the SSDH hash codes against the shallow network hash codes for different values of thresholds and may choose a threshold that best matches the two hash codes.

Figure 8:
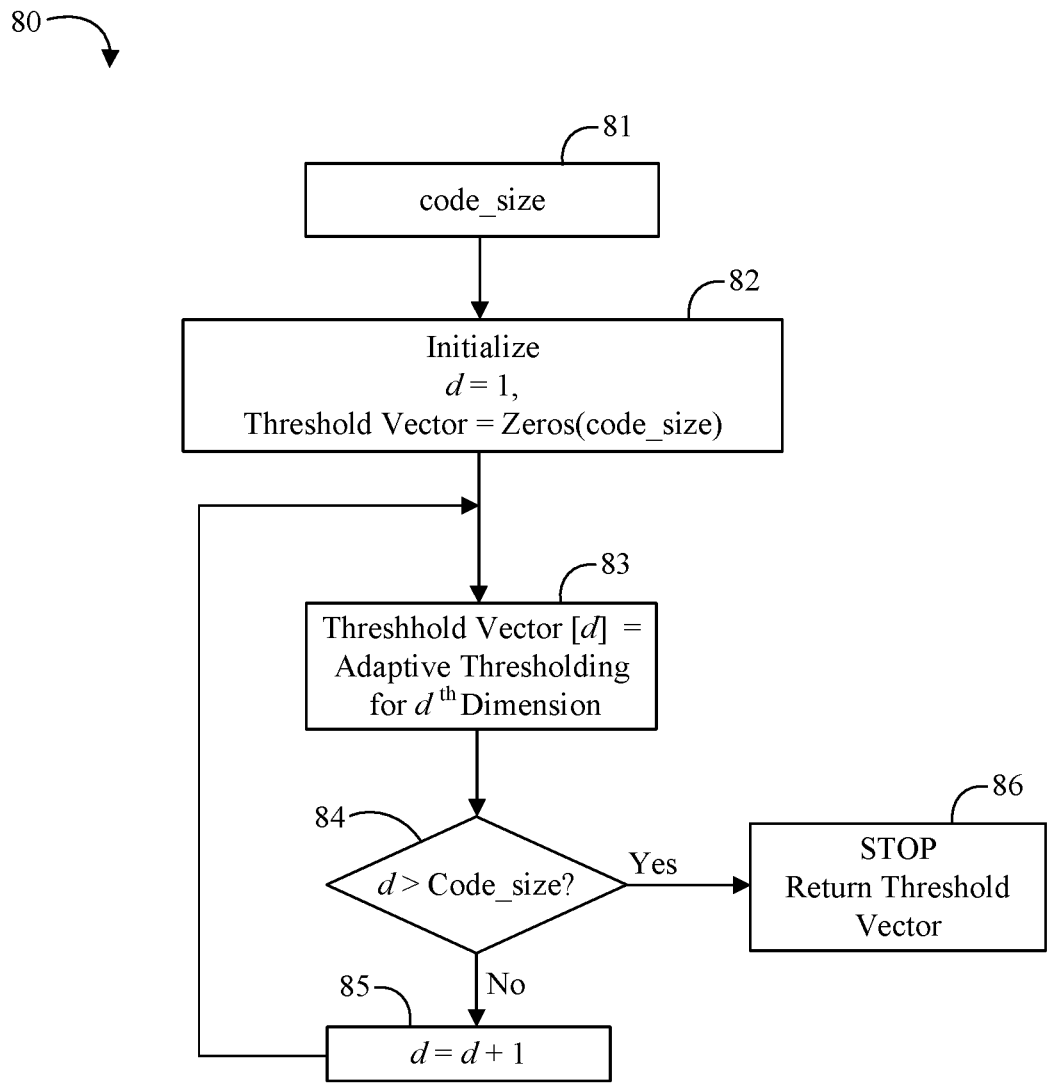
FIG. 8 is a flowchart of an example of a method of adaptive bitwise thresholding according to an embodiment.

Turning now to FIG. 8, an embodiment of a method 80 of adaptive bitwise thresholding may include determining a code size at block 81, and initializing a dimension variable d to 1 and zeroing a threshold vector at block 82. Adaptive thresholding for the $d^{th}$ dimension may be applied and the result may be stored in the $d^{th}$ position in the threshold vector at block 83 (e.g., see FIG. 9). If d is not greater than the code size at block 84, then d may be incremented at block 85 and the method 80 may return to block 83 to apply adaptive thresholding to each dimension. When d is greater than the code size at block 84, the method 80 may stop and return the threshold vector at block 86.

Figure 9:
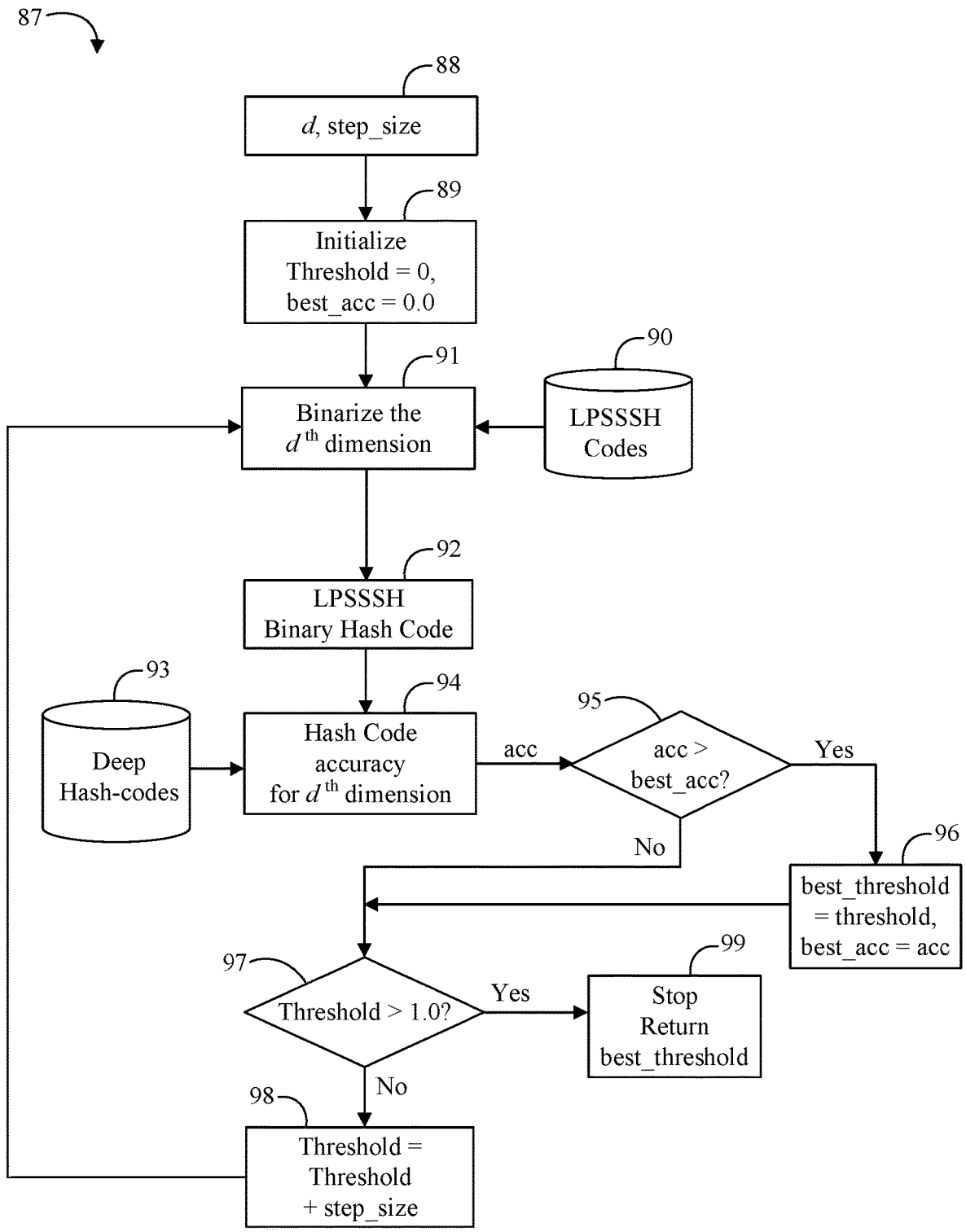
FIG. 9 is a flowchart of an example of a method of adaptive thresholding according to an embodiment.

Turning now to FIG. 9, an embodiment of method 87 of adaptive thresholding for a $d^{th}$ dimension (e.g., corresponding to block 83 in FIG. 8) may include determining a step_size at block 88, and initializing variable for a threshold and a best accuracy (best_acc) to zero at block 89. The method 87 may read a shallow hash code at block 90 and binarize the $d^{th}$ dimension of the shallow hash code based on the current value of the threshold variable at block 91 to provide a binary shallow hash code at block 92. The method 87 may then read a corresponding deep hash code at block 93 and determine a hash code accuracy (acc) between the shallow hash code and the deep hash code at block 94. If acc is greater than best_acc at block 95, then best_acc is set equal to acc and a best threshold variable (best_threshold) is set equal to the current threshold value at block 96. The method 87 may then determine if the threshold is greater than 1.0 at block 97. If not, the threshold variable may be increased by the step_size at block 98 and then method may then continue at block 91. When the threshold is greater than 1.0 at block 97, the method 87 may stop and return the best_threshold at block 99.

Some embodiments may improve the training of the shallow hashing neural network with accuracy based early stopping. For example, the mAP score may provide an accuracy evaluation criteria for hash codes. Shallow hash neural network training using deep hash codes may result in unstable decreases in mAP score over different epochs. To prevent overfitting, some neural networks may utilize early stopping based on classification accuracy criterion. However, improvement in classification accuracy does not always imply an increase in mAP score. To prevent overfitting, some embodiments may utilize a mAP-based early stopping criteria. For example, some embodiments may calculate a mAP score on a validation set and save the network with highest mAP score.

Figure 10:
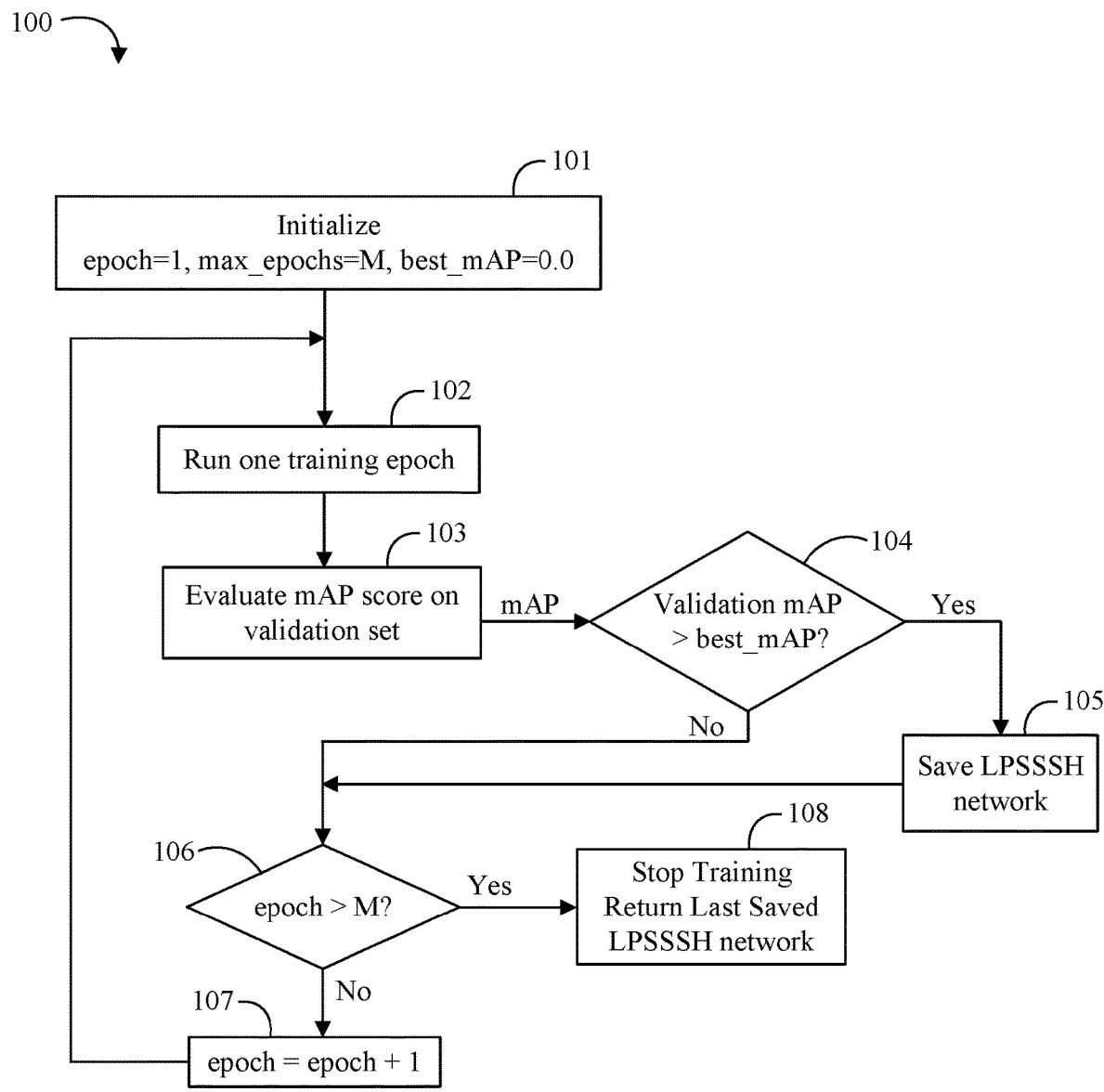
FIG. 10 is a flowchart of an example of a method of early stopping according to an embodiment.

Turning now to FIG. 10, an embodiment of a method 100 of early stopping may include initializing variables for epoch to 1, max_epochs to M, and best_mAP to 0.0 at block 101, and running one training epoch at block 102. After the training epoch is complete, the method 100 may evaluate a mAP score on a validation set at block 103. If the mAP score for the validation set is greater than best_mAP at block 104, the method 100 may save the shallow hash network at block 105. The method 100 may then determine if epoch is greater than M at block 106. If not, epoch may be incremented at block 107 and the method may continue at block 102. When epoch is greater than M at block 106, the method 100 may stop and return the last saved shallow hash network at block 108.

Figure 11:
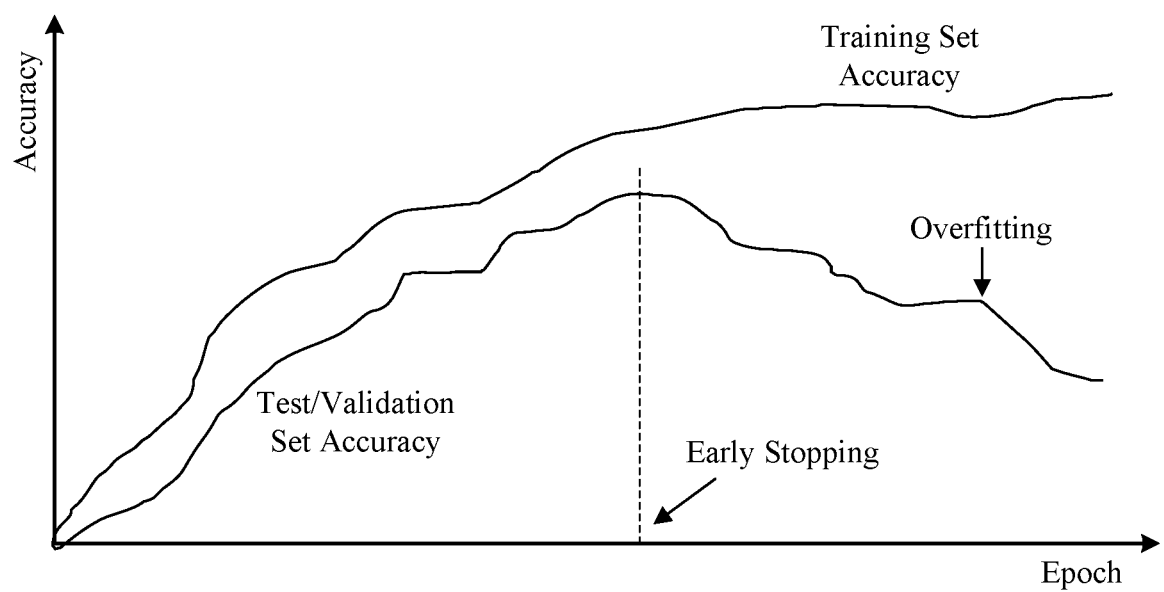
FIG. 11 is an illustrative graph of an example of epochs versus accuracy according to an embodiment.

Turning now to FIG. 11, an illustrative graph shows how an embodiment of accuracy-based early stopping may reduce or prevent overfitting. Some embodiments may advantageously utilize both adaptive bitwise thresholding and accuracy-based early stopping to provide a shallow hash network with high accuracy and low power consumption.

Figure 12:
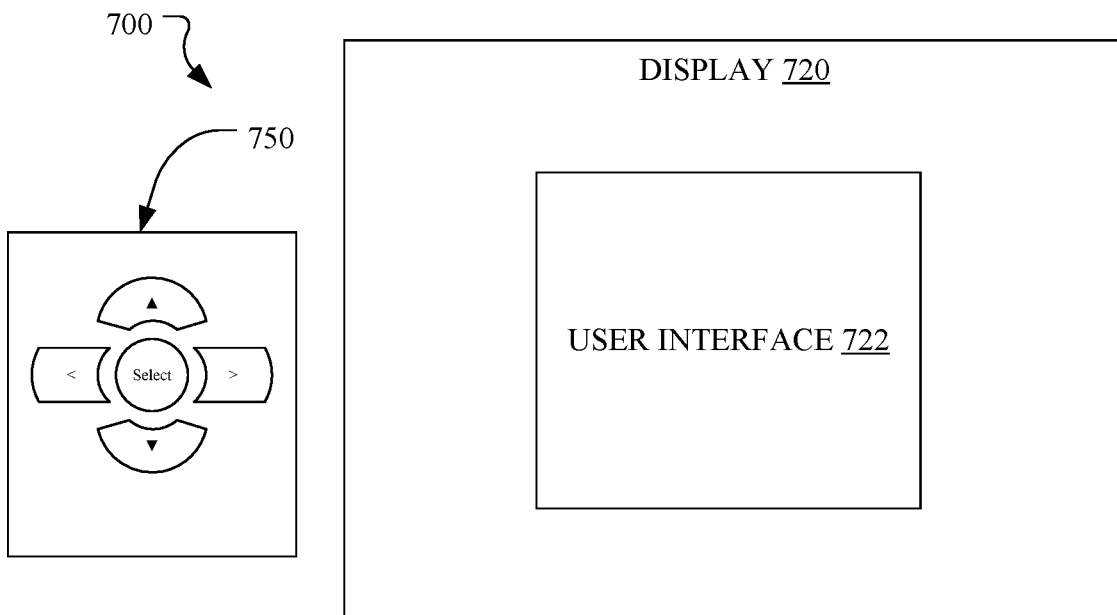
FIG. 12 is a block diagram of an example of a system having a navigation controller according to an embodiment.
Figure 12:
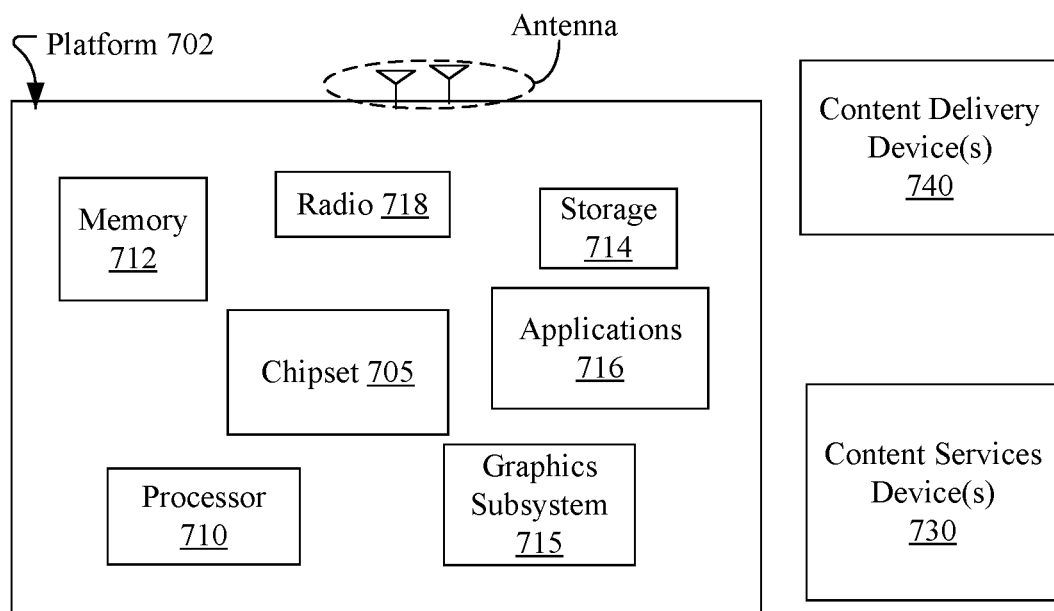
Figure 12:
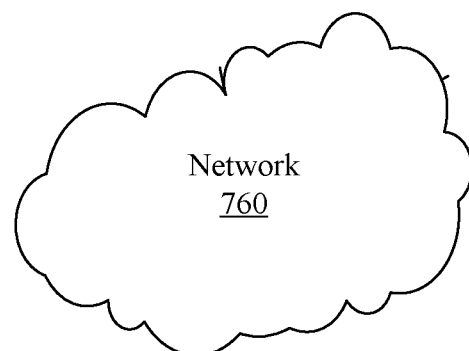

FIG. 12 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
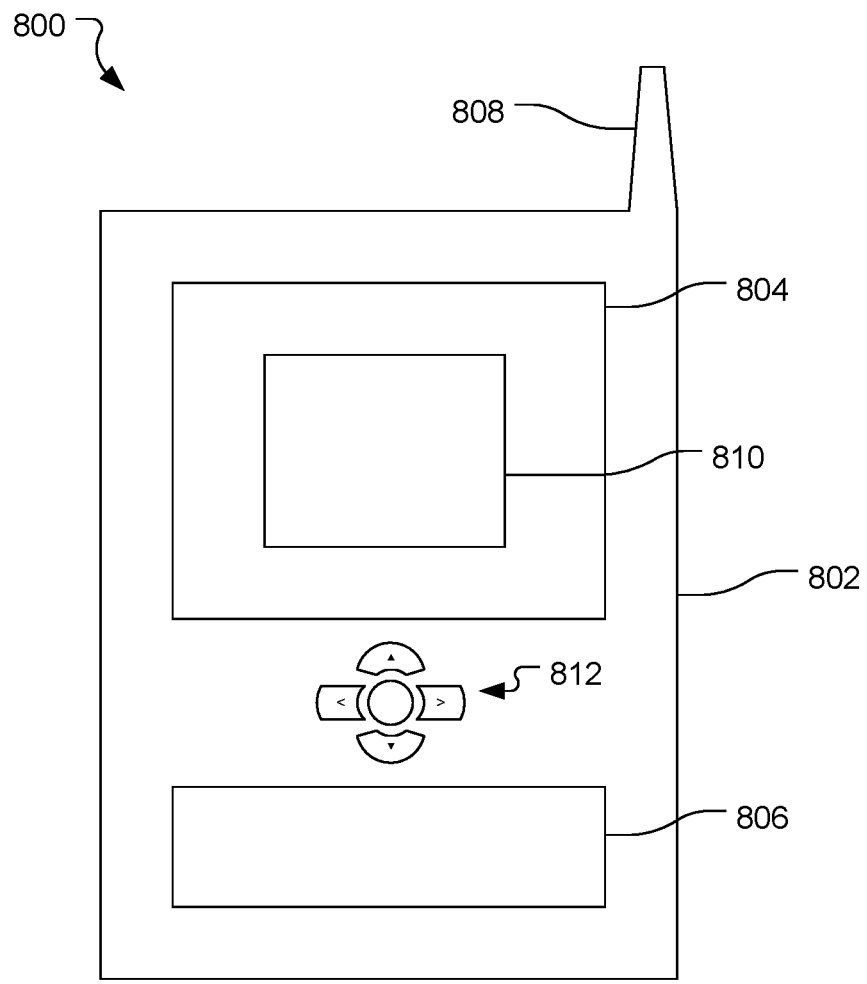
FIG. 13 is a block diagram of an example of a system having a small form factor according to an embodiment.

As described above, the system 700 may be embodied in varying physical styles or form factors. FIG. 13 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

In accordance with some embodiments, the system 700 and/or the device 800 may be advantageously configured with one or more features of a shallow hash network and/or training of a shallow hash network as described herein (e.g., including adaptive bitwise thresholding and/or accuracy-based early stopping). For example, the system 700 and/or the device 800 may include one or more of the features described in the below Additional Notes and Examples.

Additional Notes and Examples

Example 1 may include an electronic processing system, comprising a processor, memory communicatively coupled to the processor, and logic communicatively coupled to the processor to provide an image to a low power shallow hash network, generate a hash code from the low power shallow hash network, and identify one or more similar images based on the hash code.

Example 2 may include the system of Example 1, wherein the logic is further to provide a set of hash codes, and train a shallow neural network to provide the low power shallow hash network based on the set of hash codes as label data.

Example 3 may include the system of Example 2, wherein the logic is further to adjust a bitwise threshold based on a match between a set of target hash codes and one or more hash codes from the shallow neural network.

Example 4 may include the system of Example 2, wherein the logic is further to stop the train of the shallow neural network based on a hash code evaluation criteria.

Example 5 may include the system of Example 4, wherein the logic is further to return the low power shallow hash network corresponding to a highest mean average precision accuracy.

Example 6 may include the system of any of Examples 2 to 5, wherein the logic is further to train a deep neural network to generate the set of hash codes based on a set of training images.

Example 7 may include a semiconductor package apparatus, comprising a substrate, and logic coupled to the substrate, wherein the logic is at least partly implemented in one or more of configurable logic and fixed-functionality hardware logic, the logic coupled to the substrate to provide an image to a low power shallow hash network, generate a hash code from the low power shallow hash network, and identify one or more similar images based on the hash code.

Example 8 may include the apparatus of Example 7, wherein the logic is further to provide a set of hash codes, and train a shallow neural network to provide the low power shallow hash network based on the set of hash codes as label data.

Example 9 may include the apparatus of Example 8, wherein the logic is further to adjust a bitwise threshold based on a match between a set of target hash codes and one or more hash codes from the shallow neural network.

Example 10 may include the apparatus of Example 8, wherein the logic is further to stop the train of the shallow neural network based on a hash code evaluation criteria.

Example 11 may include the apparatus of Example 10, wherein the logic is further to return the low power shallow hash network corresponding to a highest mean average precision accuracy.

Example 12 may include the apparatus of any of Examples 8 to 11, wherein the logic is further to train a deep neural network to generate the set of hash codes based on a set of training images.

Example 13 may include a method of identifying images, comprising providing an image to a low power shallow hash network, generating a hash code from the low power shallow hash network, and identifying one or more similar images based on the hash code.

Example 14 may include the method of Example 13, further comprising providing a set of hash codes, and training a shallow neural network to provide the low power shallow hash network based on the set of hash codes as label data.

Example 15 may include the method of Example 14, further comprising adjusting a bitwise threshold based on a match between a set of target hash codes and one or more hash codes from the shallow neural network.

Example 16 may include the method of Example 14, further comprising stopping the training of the shallow neural network based on a hash code evaluation criteria.

Example 17 may include the method of Example 16, further comprising returning the low power shallow hash network corresponding to a highest mean average precision accuracy.

Example 18 may include the method of any of Examples 14 to 17, further comprising training a deep neural network to generate the set of hash codes based on a set of training images.

Example 19 may include at least one computer readable medium, comprising a set of instructions, which when executed by a computing device, cause the computing device to provide an image to a low power shallow hash network, generate a hash code from the low power shallow hash network, and identify one or more similar images based on the hash code.

Example 20 may include the at least one computer readable medium of Example 19, comprising a further set of instructions, which when executed by the computing device, cause the computing device to provide a set of hash codes, and train a shallow neural network to provide the low power shallow hash network based on the set of hash codes as label data.

Example 21 may include the at least one computer readable medium of Example 20, comprising a further set of instructions, which when executed by the computing device, cause the computing device to adjust a bitwise threshold based on a match between a set of target hash codes and one or more hash codes from the shallow neural network.

Example 22 may include the at least one computer readable medium of Example 20, comprising a further set of instructions, which when executed by the computing device, cause the computing device to stop the training of the shallow neural network based on a hash code evaluation criteria.

Example 23 may include the at least one computer readable medium of Example 22, comprising a further set of instructions, which when executed by the computing device, cause the computing device to return the low power shallow hash network corresponding to a highest mean average precision accuracy.

Example 24 may include the at least one computer readable medium of any of Examples 20 to 23, comprising a further set of instructions, which when executed by the computing device, cause the computing device to train a deep neural network to generate the set of hash codes based on a set of training images.

Example 25 may include an image identifier apparatus, comprising means for providing an image to a low power shallow hash network, means for generating a hash code from the low power shallow hash network, and means for identifying one or more similar images based on the hash code.

Example 26 may include the apparatus of Example 25, further comprising means for providing a set of hash codes, and means for training a shallow neural network to provide the low power shallow hash network based on the set of hash codes as label data.

Example 27 may include the apparatus of Example 26, further comprising means for adjusting a bitwise threshold based on a match between a set of target hash codes and one or more hash codes from the shallow neural network.

Example 28 may include the apparatus of Example 26, further comprising means for stopping the training of the shallow neural network based on a hash code evaluation criteria.

Example 29 may include the apparatus of Example 28, further comprising means for returning the low power shallow hash network corresponding to a highest mean average precision accuracy.

Example 30 may include the apparatus of any of Examples 26 to 29, further comprising means for training a deep neural network to generate the set of hash codes based on a set of training images.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
    a processor;
    memory communicatively coupled to the processor; and
    logic communicatively coupled to the processor to:
        provide an image to a low power shallow hash network,
        generate a hash code from the low power shallow hash network,
        identify one or more similar images based on the hash code,
        provide a set of hash codes,
        train a shallow neural network to provide the low power shallow hash network based on the set of hash codes as label data, and
        adjust a bitwise threshold based on a match between a set of target hash codes and one or more hash codes from the shallow neural network.
2. The system of claim 1, wherein the logic is further to:
    stop the train of the shallow neural network based on a qualitative hash code evaluation criteria.
3. The system of claim 1, wherein the logic is further to:
    run two or more training epochs on the shallow neural network;
    determine a mean average precision (mAP) score for each of the two or more training epochs; and
    return the low power shallow hash network corresponding to a highest mean average precision mAP score.
4. The system of claim 1, wherein the logic is further to:
    train a deep neural network to generate the set of hash codes based on a set of training images.
5. A semiconductor package apparatus, comprising:
    a substrate; and
    logic coupled to the substrate, wherein the logic is at least partly implemented in one or more of configurable logic and fixed-functionality hardware logic, the logic coupled to the substrate to:
        provide an image to a low power shallow hash network,
        generate a hash code from the low power shallow hash network, identify one or more similar images based on the hash code, provide a set of hash codes, train a shallow neural network to provide the low power shallow hash network based on the set of hash codes as label data, and adjust a bitwise threshold based on a match between a set of target hash codes and one or more hash codes from the shallow neural network.

6. The apparatus of claim 5, wherein the logic is further to:

stop the train of the shallow neural network based on a qualitative hash code evaluation criteria.

7. The apparatus of claim 5, wherein the logic is further to:

run two or more training epochs on the shallow neural network;

determine a mean average precision (mAP) score for each of the two or more training epochs; and return the low power shallow hash network corresponding to a highest mean average precision (mAP) score.

8. The apparatus of claim 5, wherein the logic is further to:

train a deep neural network to generate the set of hash codes based on a set of training images.

9. A method of identifying images, comprising:

providing an image to a low power shallow hash network;

generating a hash code from the low power shallow hash network;

identifying one or more similar images based on the hash code;

providing a set of hash codes;

training a shallow neural network to provide the low power shallow hash network based on the set of hash codes as label data; and adjusting a bitwise threshold based on a match between a set of target hash codes and one or more hash codes from the shallow neural network.

10. The method of claim 9, further comprising:

stopping the training of the shallow neural network based on a qualitative hash code evaluation criteria.

11. The method of claim 9, further comprising:

running two or more training epochs on the shallow neural network;

determining a mean average precision (mAP) score for each of the two or more training epochs; and returning the low power shallow hash network corresponding to a highest mean average precision mAP score.

12. The method of claim 9, further comprising:

training a deep neural network to generate the set of hash codes based on a set of training images.

13. At least one non-transitory computer readable medium, comprising a set of instructions, which when executed by a computing device, cause the computing device to:

provide an image to a low power shallow hash network;

generate a hash code from the low power shallow hash network;

identify one or more similar images based on the hash code;

provide a set of hash codes;

train a shallow neural network to provide the low power shallow hash network based on the set of hash codes as label data; and adjust a bitwise threshold based on a match between a set of target hash codes and one or more hash codes from the shallow neural network.

14. The at least one non-transitory computer readable medium of claim 13, comprising a further set of instructions, which when executed by the computing device, cause the computing device to:

stop the training of the shallow neural network based on a qualitative hash code evaluation criteria.

15. The at least one non-transitory computer readable medium of claim 13, comprising a further set of instructions, which when executed by the computing device, cause the computing device to:

run two or more training epochs on the shallow neural network;

determine a mean average precision (mAP) score for each of the two or more training epochs; and return the low power shallow hash network corresponding to a highest mean average precision mAP score.

16. The at least one non-transitory computer readable medium of claim 13, comprising a further set of instructions, which when executed by the computing device, cause the computing device to:

train a deep neural network to generate the set of hash codes based on a set of training images.

* * * * *